US007390558B2

(12) United States Patent
Aritake et al.

(10) Patent No.: US 7,390,558 B2
(45) Date of Patent: Jun. 24, 2008

(54) ALIPHATIC POLYESTER FILM AND PACKAGING MATERIAL

(75) Inventors: Toshiyuki Aritake, Shiga (JP); Shigenori Terada, Shiga (JP)

(73) Assignee: Mitsubishi Plastics, Inc., Tokyo (JP)

( * ) Notice: Subject to any disclaimer, the term of this patent is extended or adjusted under 35 U.S.C. 154(b) by 13 days.

(21) Appl. No.: 10/565,532

(22) PCT Filed: Jul. 16, 2004

(86) PCT No.: PCT/JP2004/010198

§ 371 (c)(1),
(2), (4) Date: Apr. 3, 2006

(87) PCT Pub. No.: WO2005/007403

PCT Pub. Date: Jan. 27, 2005

(65) Prior Publication Data
US 2006/0177674 A1     Aug. 10, 2006

(30) Foreign Application Priority Data
Jul. 18, 2003    (JP)    ............................. 2003-199296

(51) Int. Cl.
B32B 7/00       (2006.01)
B32B 15/09      (2006.01)
B32B 27/06      (2006.01)
B32B 27/36      (2006.01)
B32B 37/15      (2006.01)

(52) U.S. Cl. ........................ 428/212; 428/457; 428/458; 428/480; 428/910; 264/173.16; 427/419.1; 427/419.2; 156/244.11

(58) Field of Classification Search .................. None
See application file for complete search history.

(56) References Cited

U.S. PATENT DOCUMENTS 5,556,711 A * 9/1996 Ajioka et al. ............... 428/460
6,153,276 A 11/2000 Oya et al.
7,175,917 B2 * 2/2007 Sukigara et al. ............ 428/480
2006/0100395 A1 * 5/2006 Aritake ....................... 525/450

FOREIGN PATENT DOCUMENTS

| JP | 10-151715 A  |   | 6/1988 |
| JP | 10-151715    | * | 6/1998 |
| JP | 11-042752 A  |   | 2/1999 |
| JP | 15-062933    | * | 3/2003 |
| JP | 2003-062933  | * | 3/2003 |
| JP | 2003-062933 A |  | 3/2003 |
| JP | 2003-064303 A |  | 3/2003 |
| JP | 15-094585    | * | 4/2003 |
| JP | 2003-094585  | * | 4/2003 |
| JP | 2003-094585 A |  | 4/2003 |
| JP | 2003-145677  | * | 5/2003 |
| JP | 2003-145677 A |  | 5/2003 |

OTHER PUBLICATIONS

Patent Abstracts of Japan for JP2003-062933 published Mar. 5, 2003.
Patent Abstracts of Japan for JP2003-064303 published Mar. 5, 2003.
Patent Abstracts of Japan for JP11-042752 published Feb. 16, 1999.
Patent Abstracts of Japan for JP2003-145677 published May 20, 2003.
International Search Report for PCT/JP2004/010198 mailed Nov. 2, 2004.

* cited by examiner

Primary Examiner—Vivian Chen
(74) Attorney, Agent, or Firm—Darby & Darby P.C.

(57) ABSTRACT

An aliphatic polyester film on which an inorganic gas-barrier film is formed by deposition to improve the gas barrier properties of the aliphatic polyester wherein the adhesion between the aliphatic polyester film and the deposited gas-barrier film has been improved. The aliphatic polyester film is biaxially stretched and comprises at least two layers (layers A and B). Each of the layers A and B contain an amorphous polylactic acid resin and a crystalline polylactic acid resin in a predetermined ratio.

15 Claims, No Drawings

ALIPHATIC POLYESTER FILM AND PACKAGING MATERIAL

This is a U.S. National Phase Application under 35 U.S.C. §371 of International Patent Application No. PCT/JP2004/010198 filed Jul. 16, 2004, and claims the benefit of Japanese Patent Application No. 2003-199296 filed Jul. 18, 2003, both of which are incorporated by reference herein. The International Application was published in Japanese on Jan. 27, 2005 as WO 2005/007403 A1 under PCT Article 21(2).

TECHNICAL FIELD

This invention relates to a biaxially stretched and oriented polyester film produced to improve adhesion to a gas barrier film in order to impart oxygen gas barrier properties to the polyester film, and a packaging material comprising such a polyester film having oxygen gas barrier properties.

BACKGROUND ART

Many of conventional plastic products, especially plastic packaging materials, are discarded soon after use. How to dispose of them is therefore becoming a concern today. Typical packaging plastics include polyethylenes, polypropylenes and polyethylene terephthalate (PET). These plastics tend to release large amounts of heat when burned and thus could damage incinerators when burned therein. Polyvinyl chloride, which is still being widely used, cannot be burned due to its self-extinguishing properties. Many of plastic products, including plastics that cannot be burned, are buried today. But due to their chemical and biological stability, they scarcely decompose in the soil, thus shortening the life of burial sites. It is therefore acutely desired to develop materials that are safe, release less heat when burned and can easily decompose in the soil. Studies for this purpose are now being vigorously made by many researchers.

Polylactic acid is one of such materials. That is, the combustion heat of polylactic acid is less than half that of polyethylenes. It is naturally hydrolyzed in the earth or in the water, and is then decomposed by microorganisms into harmless substances. Studies are now being made to form various products such as film sheets and bottles from polylactic acid.

But packaging films simply formed from polylactic acid are usually too low in gas barrier properties to be used e.g. to store foods. In JP patent publication No. 2003-62933A ("JP'933"); JP patent publication No. 2003-64303A ("JP'303"), JP patent publication No. 11-42752A ("JP'752") and JP patent publication No. 2003-145677A ("JP'677"), it is proposed to provide a thin inorganic film on a polylactic acid film by e.g. vapor deposition to impart gas barrier properties to the polylactic acid film.

Any of the above references propose to provide a thin inorganic film on a polylactic acid film by vapor deposition to improve gas barrier properties of the polylactic acid film. Specifically, in JP'933 and JP'303, a thin inorganic deposited film is adhered to a polylactic acid film through an anchor layer. The anchoring agent forming the anchor layer is an aliphatic polyester containing an L-lactic acid residue and a D-lactic acid residue in the ratio of 1-9.

In JP'752, an oxide film is deposited on a resin layer containing as its major component a hydroxycarboxylic acid containing lactic acid in its repeating unit. In JP'677, an anchor layer such as a polyester resin is formed on a biodegradable resin film of the polylactic acid family or the polyester family, and then a metallic layer is deposited thereon.

SUMMARY OF THE INVENTION

None of the above-identified patent documents refers to the crystallizability of a polylactic acid film as a substrate. If the polylactic acid film is too high in crystallizability, the adhesion between the polylactic acid film and a thin inorganic deposited film tends to deteriorate, thus making it difficult to adhere the thin inorganic deposited film to the polylactic acid film. Even if an anchoring agent is applied before depositing the inorganic film, irrespective of whether the anchoring agent is an ordinary one or one comprising a polyester resin, the adhesion between the polylactic acid film and the anchoring agent will be insufficient if the polylactic acid film is high in crystallizability, so that the adhesion between the inorganic deposited film and the polylactic acid film will be insufficient.

On the other hand, if the polylactic acid film is low in crystallizability, although the adhesion between the polylactic acid film and the inorganic deposited film improves, the strength of the film itself will be insufficient, so that the impact resistance and the damage resistance of the film will deteriorate.

An object of the present invention is to provide an aliphatic polyester film which has sufficient strength, and to which an inorganic deposited film can be formed to improve gas barrier properties of the polyester film, while keeping high adhesion between the polyester film and the inorganic deposited film.

According to the present invention, there is provided a biaxially stretched aliphatic polyester film comprising at least two layers, one of the two layers (layer A) containing an amorphous polylactic acid resin and a crystalline polylactic acid resin so as to satisfy the relation: (mass percentage of the amorphous polylactic acid resin)≧(mass percentage of the crystalline polylactic acid resin), the other of the two layers (layer B) containing an amorphous polylactic acid resin and a crystalline polylactic acid resin so as to satisfy the relation: (mass percentage of the amorphous polylactic acid resin)< (mass percentage of the crystalline polylactic acid resin).

The aliphatic polyester according to the present invention includes a plurality of resin layers each containing a crystalline polylactic acid resin and an amorphous polylactic acid resin in the specific weight ratio. It has sufficient strength, and shows gas barrier properties if a thin inorganic deposited film is formed thereon. The adhesion between the polyester film and the inorganic deposited film is sufficiently high. If such an inorganic deposited film is formed on the polyester film through an anchor layer, the anchor layer prevents peeling of the inorganic deposited film while the polyester film is used as a packaging material. This keeps gas barrier properties of the polyester film and thus makes the polyester film suitable for use in food packaging.

DETAILED DESCRIPTION OF THE INVENTION

The present invention is described in further detail.

The aliphatic polyester film according to the present invention is a biaxially stretched film comprising at least two layers. The aliphatic polyester film according to the present invention can be advantageously used for deposition.

The aliphatic polyester forming the aliphatic polyester film of the invention is a resin containing as its major component a polylactic acid resin. The polylactic acid resin refers to a polymer containing L-, D- or DL-lactic acid units as its major components. Such a polymer may be a polymer of lactic acid only, or a copolymer of L-, D- or DL-lactic acid and hydroxycarboxylic acids, aliphatic dicarboxylic acids, and/or aliphatic diols. (It is to be understood that throughout the specification, "aliphatic" encompasses "cycloaliphatic".) Such a polymer should contain polylactic acid components by not less than 50%, preferably not less than 70%, more preferably not less than 90%. If the content of the polylactic acid components is less than 50%, the elastic modulus of the polyester film tends to be insufficient as a packaging material, or the adhesion between the polyester film and the anchor layer may be insufficient. Its heat resistance may be inferior, too.

The polylactic acid resin may be polymerized by any known method such as condensation polymerization or ring-opening polymerization. If condensation polymerization is used, a polylactic acid resin having a desired composition can be obtained by subjecting D-lactic acid, L-lactic acid or a mixture of such lactic acid and the abovementioned other monomer or monomers to dehydrating condensation polymerization.

In ring-opening polymerization (lactide process), a polylactic acid resin is obtainable by polymerizing lactide, i.e. a cyclic dimer of lactic acid, using a selected catalyst while optionally adding a polymerization regulator and optionally mixing the abovementioned other monomer or monomers.

The polylactic acid resin used in this invention has a weight-average molecular weight preferably in the range of 60000 to 700000, more preferably 60000 to 400000, especially preferably 100000 to 300000. If the molecular weight is less than 60000, the practical physical properties of the polylactic acid film such as mechanical strength and heat resistance will scarcely improve. If the molecular weight is higher than 700000, the melt viscosity will rise to such an extent as to impair formability and workability of the polyester resin.

If the lactic acid is one of optical isomers, the abovementioned other monomer or monomers to be copolymerized with the polylactic acid, such as other hydroxycarboxylic acid, aliphatic dicarboxylic acids, and/or aliphatic diols, may be the other of the optical isomers (for example, if the lactic acid is D-lactic acid, the other monomer may be L-lactic acid, and if the former is L-lactic acid, the latter may be D-lactic acid). Also, hydroxycarboxylic acids as the other monomer or monomers include bifunctional aliphatic hydroxycarboxylic acids such as glycolic acid, 3-hydroxybutyric acid, 4-hydroxybutyric acid, 2-hydroxy-n-butyric acid, 2-hydroxy-3,3-dimethylbutyric acid, 2-hydroxy-3-methylbutyric acid, 2-methyllactic acid and 2-hydroxycaproic acid, and lactones such as caprolactone, butyrolactone and valerolactone.

Aliphatic dicarboxylic acids as the other monomer or monomers include succinic acid, adipic acid, suberic acid, sebacic acid, dodecanedioic acid, and their anhydrides and derivatives. Aliphatic diols as the other monomer or monomers include ethylene glycol, butanediol, hexanediol, octanediol, cyclopentanediol, cyclohexanediol, cyclohexanedimethanol and their derivatives. Any of them preferably contains as its major component a bifunctional compound having an alkylene or cycloalkylene group having 2 to 10 carbon atoms. Of course, two or more kinds of carboxylic acid components or alcohol components may be used.

The aliphatic polyester may further contain small amounts of:
(a) more than bifunctional carboxylic acid units, alcohol units or hydroxycarboxylic acid units; or
(b) non-aliphatic dicarboxylic acid units and/or non-aliphatic diol units. It may further contain small amounts of chain extender residues.

The units in (a) are used to provide branches in the polymer, thereby improving melt viscosity. Specific such units include malic acid, tartaric acid, citric acid, trimellitic acid, pyromellitic acid and multifunctional components such as pentaerythritol and trimethylolpropane. If these components were used in large quantities, the polymer obtained tends to be crosslinked, thus losing its thermoplasticity, or even if it maintains thermoplasticity, highly crosslinked microgels may develop, which may in turn form fisheyes in the film. Thus, the contents of such multifunctional components in the polymer have to be limited to a very low level at which they will not significantly influence the chemical and physical properties of the polymer.

Specific non-aliphatic dicarboxylic acids mentioned in item (b) include terephthalic acid. Specific non-aliphatic diols in item (b) include ethylene oxide adducts of bisphenol A.

The aliphatic polyester according to the present invention may contain, besides the polylactic acid resin as its major component, other resin components. For transparency of the film, the content of such other resin components is preferably not more than 30 percent by weight, more preferably not more than 20 percent by weight, further preferably not more than 10 percent by weight. Specifically, such other resin components include aliphatic polyesters other than a polylactic acid resin. Aliphatic polyesters other than a polylactic acid resin include polymers of hydroxycarboxylic acids other than lactic acid, and polyesters comprising dicarboxylic acids and/or aliphatic diols. The hydroxycarboxylic acids, aliphatic dicarboxylic acids and aliphatic diols herein used are the same as those described above.

The aliphatic polyester other than a polylactic acid resin may contain small amounts of copolymer units as described above, and also may contain small amounts of chain extender residues (such as lactic acid residues and/or isocyanate residues).

The polyester comprising aliphatic dicarboxylic acids and aliphatic diols is adjustable by a known method such as a direct or indirect method. In a direct method, aliphatic dicarboxylic acids and aliphatic diols are directly polymerized while removing water contained therein or produced during polymerization to obtain a high-molecular weight product. In an indirect method, after polymerizing aliphatic dicarboxylic acids and aliphatic diols to oligomers, a high-molecular weight product is obtained using small amounts of chain extenders (such as lactic acids and/or isocyanates) as in the case of the polylactic acid resin.

Preferably, the other resin components have a weight-average molecular weight of 30000 to 250000, more preferably 50000 to 150000. If their weight-average molecular weight is less than 30000, the properties of the polymer tend to deteriorate. In particular, the adhesion to the anchoring agent will not improve. Moreover, the other resin components tend to bleed onto the surface of the film with time. If the molecular weight is greater than 250000, the melt viscosity will increase to such an extent as to lower the mixability in polylactic acid and make it difficult to form a film by extruding, as in the case of the polylactic acid.

For improved impact resistance and cold resistance, the other resin components have preferably a glass transition point (Tg) not exceeding 0 degrees C., more preferably not exceeding −30 degrees C.

Suitable such other resin components include polyethylene suberate, polyethylene sebacate, polyethylene decandicarboxylate, polybutylene succinate, polybutylene adipate, polybutylene sebacate, polybutylene succinate adipate, and their copolymers.

According to the present invention, together with or instead of the other resin components, a block copolymer of the polylactic acid resin and the other resin components (including its partially ester-exchanged product and a product containing small amounts of chain extender residues) may be used. Such a block copolymer is adjustable by any desired method. For example, the polylactic acid resin or the other resin components are prepared in the form of a polymer, and in the presence of this polymer, the other monomers are polymerized. Ordinarily, a block copolymer of the polylactic acid and the other resin components is obtained by polymerizing lactide in the presence of the other resin components, which are prepared beforehand. Basically, polymerization can be carried out in the same manner as when the polylactic acid resin is prepared by a lactide method except that the other resin components coexist. Simultaneously with the polymerization of the lactide, suitable ester exchange reaction occurs between the polylactic acid and the other resin components. This produces a copolymer that is relatively high in randomness. If an aliphatic polyester urethane having urethane bonds is used as a starting material, ester-amide exchange also occurs.

The aliphatic polyester film comprises two layers. One of the two layers (hereinafter referred to as "layer A") contains an amorphous polylactic acid resin and a crystalline polylactic acid resin so as to satisfy the relation: (mass percentage of the amorphous polylactic acid resin)≧(mass percentage of the crystalline polylactic acid resin);

Preferably, the ratio, in mass percent, between the amorphous polylactic acid resin and the crystalline polylactic acid resin is 50:50 to 90:10, more preferably 60:40 to 85:15. Within this range, the layer A can be easily bondable to other layers.

If the content (in mass percent) of the amorphous polylactic acid resin is lower than the content (in mass percent) of the crystalline polylactic acid resin, the adhesion between the layer A and an anchoring agent tends to be insufficient. If the layer A consists only of the amorphous polylactic acid resin, blocking tends to occur between the polyester film and other films, which is not desirable.

The content ratio between D-lactic acid and L-lactic acid in the amorphous polylactic acid resin is preferably 10:90 to 90:10, and the content ratio between D-lactic acid and L-lactic acid in the crystalline polylactic acid resin is preferably 0.5:99.5 to 6:94 or 99.5:0.5 to 94:6.

If the content ratio between D-lactic acid and L-lactic acid in the amorphous polylactic acid resin is lower than 10:90 or higher than 90:10, the layer A will begin to gradually exhibit crystallinity. This lowers the adhesion between the layer A and an anchoring agent to an insufficient level. If the content ratio between D-lactic acid and L-lactic acid in the crystalline polylactic acid resin is higher than 6:94 and lower than 94:6, while the adhesion between the layer A and the anchor layer improves, blocking tends to occur between film surfaces before an anchoring agent is applied.

Even if the content ratio between D-lactic acid and L-lactic acid in the crystalline polylactic acid resin is lower than 0.5:99.5 or higher than 99.5:0.5, there is no significant deterioration in performance. But the cost of the layer A tends to be high. If the layer A consists only of the amorphous polylactic acid resin, it is impossible to increase the heat treatment temperature after stretching. Thus, the film is low in heat resistance.

The other layer (hereinafter referred to as "layer B") contains an amorphous polylactic acid resin and a crystalline polylactic acid resin so as to satisfy the relation: (mass percentage of the amorphous polylactic acid resin)<(mass percentage of the crystalline polylactic acid resin).

The ratio, in mass percent, between the amorphous polylactic acid resin and the crystalline polylactic acid resin is preferably 30:70 to 0:100, more preferably 15:85 to 0:100. Within this range, the layer B shows increased impact resistance and heat resistance.

The impact strength, more particularly the hydroshot impact value, of the layer B is preferably not less than 30 kgf·mm, more preferably not less than 50 kgf·mm, further preferably not less than 60 kgf·mm. If this value is not less than 30 kgf·mm, packaging materials containing layer B shows sufficient strength for practical use.

The content ratio between D-lactic acid and L-lactic acid in the crystalline polylactic acid resin is preferably 0.5:99.5 to 6:94 or 99.5:0.5 to 94:6, more preferably 0.5:99.5 to 4.5:95.5 or 99.5:0.5 to 95.5:4.5. The content ratio between D-lactic acid and L-lactic acid in the amorphous polylactic acid resin is preferably 10:90 to 90:10. For higher strength and heat resistance, the content of the amorphous polylactic acid resin in the layer B can be as low as possible.

If the content ratio between D-lactic acid and L-lactic acid in the crystalline polylactic acid resin is higher than 6:94 and lower than 94:6, while the adhesion improves, blocking tends to occur between film surfaces before an anchoring agent is applied. If the content ratio between D-lactic acid and L-lactic acid in the amorphous polylactic acid resin is lower than 10:90 or higher than 90:10, the layer B begins to gradually exhibit crystallinity. This lowers the adhesion between the layer B and an anchoring agent to an insufficient level.

Even if the content ratio between D-lactic acid and L-lactic acid in the crystalline polylactic acid resin is lower than 0.5:99.5 or higher than 99.5:0.5, there is no significant deterioration in performance. But the cost of the layer A tends to be high.

The aliphatic polyester film according to the present invention comprises at least one each of the layers A and B, and may have any of the following layer structures: layer A/layer B, layer A/layer B/layer A, layer A/layer B/layer B/layer A, and layer A/layer B/layer A/layer B. It is important that at least one of the outermost layers of the film be formed by layer A. Since layer A is high in adhesion, by arranging at least one layer A so as to form an outermost layer of the aliphatic polyester film, the film exhibits heat sealability.

Preferably, for sufficient strength of the film, the sum of the thicknesses of the layers A or the thickness of the single layer A is greater than the sum of the thicknesses of the layers B or the thickness of the single layer B.

The thus formed film is heat-fixed at a temperature of not less than 110 degrees C. and less than the melting point of the crystalline polylactic acid, preferably at a temperature in the range of 115 degrees C. to the melting point of the crystalline polylactic acid film less 20 degrees C. to improve the strength and heat resistance to sufficient levels.

Layers A and/or B that form the outermost layers of the aliphatic polyester film preferably contain a lubricant to improve sliding properties of the film when forming the film or to ensure smooth rolling of a roll during vapor deposition. The lubricant is preferably inorganic particles.

Such inorganic particles include silicon dioxides such as silica, calcium carbonate, magnesium carbonate, talc, titanium dioxide, kaolin and alumina, and are preferably a silicon dioxide such as silica, calcium carbonate, magnesium carbonate, talc, titanium dioxide or kaolin, more preferably a silicon dioxide such as silica. Chained silicon dioxide particles are especially preferable because they are less likely to separate while producing the film, forming an anchor coat or depositing a film. The inorganic particles may be formed of one or more than one of the abovementioned substances.

The content of the inorganic particles in the respective layers is preferably 0.01 to 6 parts by weight, more preferably 0.01 to 3 parts by weight, further preferably 0.01 to 1 part by weight, based on 100 parts by weight of the aliphatic polyester in the respective layers. If this value is lower than 0.01 parts by weight, the inorganic particles may not improve the sliding properties of the film. If higher than 6 parts by weight, the inorganic particles may partially separate, or may ruin the transparency of the film.

If transparency of the film is important, the content of the inorganic particles should be as low as possible. But even if the content of the inorganic particles is reduced, no transparent film will be obtainable if the inorganic particles have a large particle size. The transparency of the film may be defined by haze, which can be determined under JIS K7105. The haze of the film is preferably not more than 10%. If the haze exceeds 10%, the film may have no sufficient transparency.

Although the transparency of the film is also influenced by the type and diameter of the inorganic particles added, and the thickness of the film, if transparency of the film is important, the content of the inorganic particles in the film should be limited to about 0.5 parts at the most. Any additional inorganic particles will cause the haze of the film to exceed 10%, thus ruining the clearness of the film.

If a thin film layer as a gas barrier layer is formed on the aliphatic polyester film, such a film has to be kept free of pin holes. For this purpose, it is preferable that the layer which contains the inorganic particles and on which an anchor coating agent (AC agent) is adapted to be applied have a thickness a (micrometers), and the inorganic particles have a maximum diameter b (micrometers) and an average diameter c (micrometers), wherein the values a, b and c satisfy the relations (1) to (4).

$$1 \leq a \leq 15 \quad (1)$$

$$0.5 \leq b \leq 2.5a \quad (2)$$

$$0.1 \leq c \leq 5 \quad (3)$$

$$c \leq a \quad (4)$$

If the layer containing the inorganic particles is thinner than 1 micrometer, it is essentially difficult to carry the inorganic particles in the layer and thus particles tend to separate. If this layer is thicker than 15 micrometers, the surface condition and thus the sliding properties will deteriorate. More preferably, this layer has a thickness of 1.5 to 10 micrometers.

If the maximum particle diameter of the inorganic particles is smaller than 0.5 micrometers, the sliding properties of the film will deteriorate to such an extent as to hinder a smooth feed of the film. If it is greater than 2.5 times the thickness of the layer containing the inorganic particles, moisture resistance will be insufficient. More preferably, the inorganic particles have a maximum diameter in the range of 2.0 to 15 micrometers while satisfying the relation (2) above.

The greater the average particle diameter of the inorganic particles, the rougher the surface of the film, which improves the sliding properties of the film and reduces the coefficient of friction. If the average particle diameter of the inorganic particles is smaller than 0.1 micrometers, the inorganic particles have little influence on the sliding properties. If greater than 5 micrometers, the smoothness of the surface of the film deteriorates, and the particles will tend to separate from the film. Also, if a moisture-proof film is formed on the aliphatic polyester film, such large-diameter inorganic particles tend to form pin holes in the moisture-proof film or damage the films due to abrasion between films if the inorganic particles are high in hardness. More preferably, the inorganic particles have an average particle diameter in the range of 0.4 to 4.5 micrometers. Especially if a moisture-proof film is formed on the aliphatic polyester film, by determining the average particle diameter of the inorganic particles within the above-defined range, the moisture-proof film will show improved oxygen gas barrier properties (not more than 10 $cc/m^2 \cdot 24hours$). The average particle diameter of the inorganic particles is measurable using a sedimentation balance or a Coulter counter method or by a light scattering method.

The average particle diameter of the inorganic particles should not exceed the thickness of the layer containing the inorganic particles. Otherwise, the particles tend to separate from the film.

If the layer containing the inorganic particles is layer A, and if the polylactic acid resin in the layer A has a melting point that is lower than the melting point of the polylactic acid resin forming layer B, or has no melting point, the polylactic acid resin surrounding the particles in layer A suffers less strain during stretching, so that the particles are less likely to separate from the film.

Description is now made of a process for producing the biaxially stretched aliphatic polyester according to the present invention.

This process may be any of generally known processes for producing laminated films, but a coextrusion process is especially preferable. Description is made below on how the laminated film according the invention is formed by a coextrusion process.

First, raw materials for the respective layers A and B, including aliphatic polyesters containing polylactic acid resins as their major components, and inorganic particles, are supplied to a coextruder/laminator. The raw materials may be pelletized into strands beforehand in a separate extruder. In either case, consideration has to be given to a reduction in the molecular weight due to decomposition. In order to mix the materials uniformly, the materials should be pelletized.

After fully drying these materials to remove moisture, the materials are melted in the extruder. The melt extrusion temperature is determined by taking into consideration the fact that the melting point of the polylactic acid resin varies with the composition ratio between D-lactic acid and L-lactic acid, and the melting point of the aliphatic polyester and the mixture ratio of the materials. Ordinarily, the melt extrusion temperature is determined to be in the range of 100 to 250 degrees C.

Then, layers are laminated using two or three multi-manifolds or feed blocks according to the number of layers to be laminated, and the thus laminated sheet is extruded through a slit die in the form of a molten sheet comprising two or more layers. During extrusion, it is possible to control the thicknesses of the respective layers of the sheet by adjusting the flow rates of polymers with a fixed quantity feeder such as a gear pump provided in the melt line. Into the multi-manifold or feed block for forming the outermost layer or layers, inorganic particles are supplied to mix them in the molten resin.

The molten sheet extruded from the die is then quickly cooled to a temperature lower than the glass transition temperature on a rotary cooling drum to obtain a substantially amorphous non-oriented sheet. During cooling, the adhesion between the sheet and the rotary cooling drum is preferably kept high to improve the smoothness and uniformity in thickness of the sheet. According to the present invention, the adhesion between the sheet and the drum is improved preferably by electrostatic application or by applying liquid therebetween.

In order to adjust physical properties of the abovementioned materials, heat stabilizers, hydrolysis inhibitors, light stabilizers, light absorbers, photodecomposition promoters, plasticizers, inorganic fillers, colorants, pigments, etc. may be added to the materials.

From the surface of the thus obtained film, the inorganic particles do not protrude if the stretch ratio is low. Thus, in order for the inorganic particles to protrude from the surface of the sheet, thereby contributing to improved roughness of the film, the film has to be sufficiently oriented. Specifically, the film is preferably oriented by biaxially stretching the film (such a film is hereinafter referred to as "biaxially oriented aliphatic polyester film"). The film is oriented such that an outermost layer A and, if any, an outermost layer B have a surface orientation AP of not less than $3.0 \times 10^{-3}$, more preferably not less than $5 \times 10^{-3}$. To achieve this target, the film has to be stretched not less than 1.5 times at least in one axial direction.

The biaxially oriented aliphatic polyester is obtained by biaxially stretching the film and then heat-treating the film while fixing it in position. A heat-fixed, biaxially oriented aliphatic polyester film is thus obtained. Preferably, the thus obtained film has a shrinkage percentage of not more than 10%, more preferably not more than 5% in an oven heated to 120 degrees C. in at least one of the longitudinal and transverse directions of the film. If this rate is higher than 10%, the anchoring agent tends to shrink when drying the film.

The thus obtained multilayer oriented polyester film has a surface roughness Ra (center line average roughness) that satisfies the relation $0.01 < Ra \leq 0.08$. Further, within this range, the film has preferably a ten point average roughness Rz of not more than 2.0.

The higher the roughness value Ra, the higher the roughness of the surface of the film and the higher the sliding properties. But if the Ra value is too high, the smoothness of the film will deteriorate. The smoothness of the film can be defined by Rz. The higher the Rz value compared to the Ra value, the protrusions and recesses of the surface of the film are sparse and patchy, so that the surface roughness is less uniform. The closer the Rz value to the Ra value, the more uniform the surface roughness. The Ra and Rz values can be measured under JIS B 0601.

The multilayer, biaxially oriented polyester film has a coefficient of friction (in terms of static coefficient of friction) of preferably not more than 0.8, more preferably not more than 0.5, further preferably not more than 0.3. Generally, the smaller the static coefficient of friction, the smaller the dynamic coefficient of friction, and the static coefficient of friction is higher than the dynamic coefficient of friction. The film is produced continuously and wound in the form of a roll. When wound in a roll, the adjacent layers are brought into frictional contact with each other. If the coefficient of friction of the film is high, the adjacent layers cannot slide relative to each other, making it difficult to uniformly and cleanly wind the film. The same problem will arise during the later steps including the steps of vapor deposition, processing the film such as printing and laminating, and forming bags, if the coefficient of friction is high. Further, a high coefficient of friction can generate electrostatic charges, thus significantly lowering productivity. Thus, the film has a static coefficient of friction that satisfies the abovementioned requirements.

A thin inorganic film is formed on the aliphatic polyester film by vapor deposition such as electron beam (EB) deposition, induction deposition, magnetron sputtering, and chemical vapor deposition (CVD). The thus formed inorganic film should have a thickness of not less than 20 nm in order for the inorganic film to exhibit sufficient moisture resistance, and not more than 100 nm from an economical viewpoint. Preferably, the inorganic film has a thickness in the range of 30 to 70 nm.

The deposited film is preferably an inorganic film, e.g of pure aluminum (not less than 99.9 mol % in purity). The deposited film may also be made of a material comprising, as its major component, 90.0 to 99.8 mol % of aluminum, and 0.2 to 10.0 mol % of at least one of the additives selected from magnesium, silicon, tantalum, titanium, boron, calcium, barium, carbon, manganese, etc. The latter material preferably comprises 92 to 99.5 mol % of aluminum and 0.5 to 8 mol % of one of the additives. If the material forming the deposited film contains at least one of the above additives, compared to the material of pure aluminum, the crystal forming the deposited film becomes finer. This presumably prolongs passages through which external gas has to flow to reach the inner aliphatic polyester film, and also increases the strength of the deposited film, thus more positively preventing separation of the inorganic particles protruding from the aliphatic polyester film. In order to improve the gloss level of the film, the content of the above additive or additives has to be not more than 10 mol %, preferably not more than 7 mol %, more preferably not more than 4 mol %.

If the transparency of the film is important, the deposited film should be formed of a material subjected to oxidation or nitriding. During vapor deposition, an oxide or nitride having a low degree of reaction is irradiated with e.g. electron beams in a high-vacuum vessel to heat it. The degree of reaction is controlled by introducing a suitable amount of oxygen or nitrogen. In sputtering, an intended film can be produced using an alloy target, by mixing suitable amounts of nitrogen or oxygen into argon gas and reacting them.

Such a transparent deposited film is preferably made of one of silicon oxides, aluminum oxides, a mixture of a silicon oxide and an aluminum oxide, zinc oxides and titanium oxides, more preferably one of silicon oxides, aluminum oxides, and a mixture of a silicon oxide or an aluminum oxide, further preferably one of silicon oxides and aluminum oxides. The degree of oxidation of these oxides should be determined such that X in SiOx (if the oxide is a silicon oxide) is in the range of 1.0 to 1.9, preferably 1.3 to 1.7. The degree of oxidation is controlled by adjusting the oxygen purity in the material or introducing oxygen during vapor deposition. The degree of oxidation is measured by electron spectroscopy for chemical analysis (ESCA). If the value X is less than 1.0, the film tends to be colored, which means that the transparency of the film is lost. If the value X exceeds 1.9, the gas barrier properties will be insufficient.

In order to improve the adhesion between the deposited film and the aliphatic polyester film as a substrate, an anchor coat is formed on the aliphatic polyester film before forming the deposited film. The anchor coat has a thickness of preferably 0.01 to 5 micrometers, more preferably 0.1 to 2 micrometers. The anchor coat may be of any resin used as an undercoat before depositing a film on a polyester film such as polyethylene terephthalate. But in view of today's environmental concerns, the anchor coat is preferably made of at least one of polyester resins, polyurethane resins, polyacrylic resins, polyvinyl alcohol resins, polyolefin resins and aliphatic polyester resin so that the anchor coat is biodegradable as well as the substrate.

A solvent for the anchor coat may be any of alcohols such as methyl alcohol, ethyl alcohol and isopropanol, cyclohexane, dimethyl formaldehyde, ethyl acetate, benzene, toluene, acetone, tetrahydrofuran, dioxane, chloroform and methylethylketone, but is preferably one or a mixture of alcohols such as methyl alcohol, ethyl alcohol and isopropanol, cyclohexane, dimethyl formaldehyde and ethyl acetate for improved adhesion to a polylactic acid resin.

The substrate of the present invention has high adhesion to the anchor coat. By forming the anchor coat, the adhesion of the substrate to the inorganic film improves. How the undercoat (anchor coat) is formed is not particularly limited. For example, it may be formed by a method used in the coating of a liquid resin such as gravure coating or reverse coating, or inline coating during stretching, according to the properties of a liquid resin used.

The gas-barrier aliphatic polyester film formed with an aluminum deposited film (having a thickness of 60 nm) has a gloss level (as measured from the side of the aluminum deposited film) of preferably not less than 400%, more preferably not less than 500%. If the gloss level is less than 400%, the film may look cheap.

The thus obtained gas-barrier aliphatic polyester film has preferably a oxygen gas permeability of not more than 10 cc/m$^2$·24 hr·atm, more preferably not more than 7 cc/m$^2$·24 hr·atm, further preferably not more than 4 cc/m$^2$·24 hr·atm. If this value is greater than 10 cc/m$^2$·24 hr·atm, the film's gas barrier properties will be insufficient. Such a film is unsuitable as packaging materials.

An anchor coat is preferably formed on layer A of the aliphatic polyester film as the substrate before forming the inorganic film to improve the adhesion of the polyester film to the inorganic film. The anchor coat has a thickness of preferably 0.01 to 5 micrometers, more preferably 0.1 to 2 micrometers. The anchor coat may be of any resin used as an undercoat before depositing a film on a polyester film such as polyethylene terephthalate. But in view of today's environmental concerns, the anchor coat is preferably made of at least one of polyester resins, polyurethane resins, polyacrylic resins, polyvinyl alcohol resins and polyolefin resins so that the anchor coat is biodegradable as well as the substrate.

A solvent for the anchor coat may be any of alcohols such as methyl alcohol, ethyl alcohol and isopropanol, cyclohexane, dimethyl formaldehyde, ethyl acetate, benzene, acetone, methylethylketone, tetrahydrofuran, dioxane and chloroform, but is preferably one or a mixture of alcohols such as methyl alcohol, ethyl alcohol and isopropanol, cyclohexane, dimethyl formaldehyde, ethyl acetate, benzene, and ketones such as methylethylketone.

By forming the anchor coat on the aliphatic polyester film as the substrate, the adhesion of the substrate to the inorganic film improves. How the undercoat (anchor coat) is formed is not particularly limited. For example, it may be formed by a method used in the coating of a liquid resin such as gravure coating or reverse coating.

By forming a thin film layer comprising an alloy containing aluminum as its major component, and at least one of magnesium, silicon, tantalum, titanium, boron, calcium, barium, carbon and manganese, or a thin film layer of at least one of aluminum oxides and silicon oxides on the side of the aliphatic polyester film on which the anchor layer is applied, a gas-barrier aliphatic polyester film is obtained, of which the thin film layer has high adhesion to the substrate.

EXAMPLES

Examples of the invention are now described. These examples are not intended to limit the present invention. Physical properties of Examples of the invention and Comparative Examples are measured and evaluated as indicated below. The polylactic acid resins used were produced as indicated below.

Weight-Average Molecular Weight

Using a gel permeation chromatograph HLC-8120GPC made by Tosoh Corporation, the weight-average molecular weight was measured by creating a working curve with a standard polystyrene under the following conditions.

Columns used: Shim-Pack series made by Shimadzu Corporation
GPC-801C
GPC-804C
GPC-806C
GPC-8025C
GPC-800CP
Solvent: chloroform
Concentration of sample solution: 0.2 wt/vol %
Amount of sample solution injected: 200 µl
Flow rate of solvent: 1.0 ml/minute
Temperature of the pump, column and detector: 40 degrees C.
Standard: polystyrene Measurement of the Gloss Level
The gloss level was measured under JIS K 7105

Measurement of the Haze of Film
The haze was measured under JIS K 7105.

Measurement of Oxygen Gas Permeability
The oxygen gas permeability was measured under JIS K 7126B.

Impact Resistance
Using a hydro shot impact tester (Type HTM-1) made by Toyo Seiki Seisaku-sho, shots having a diameter of a half inch were fired against each film at a speed of 3 meters per second at a temperature of 23 degrees C., and the energy necessary to break the film was calculated.

In order for the film to be useful as packaging materials, the film has to have an impact strength of at least 30 kgf·mm, and has preferably an impact strength of not less than 50 kgf·mm, more preferably not less than 60 kgf·mm.

Shrinkage Factor
Sample films were prepared each measuring 150 mm in the parallel direction (machine direction) and 15 mm in the vertical direction (transverse direction), and reference lines were drawn on each sample. The samples were then heat-treated in a hot air circulating oven at 120 degrees C. for five minutes. The shrinkage factor of each of the thus heat-treated samples was calculated as follows:

Shrinkage factor (%)={1−(the distance between the reference lines after heat treatment)/(distance between the reference lines before heat treatment)}×100.

Damage to Film While Being Fed
A roll of film was mounted in a roll-to-roll type vacuum vapor deposition device, the pressure in the device was reduced to a degree of vacuum of $10^{-4}$ Torr, aluminum was deposited while winding the film at a speed of 100 meters per minute, and the film was rewound at normal pressure. The damage to the film was then determined, and was evaluated by the following standards:
◎: Especially good
○: Good
∆: Fairly good and practically usable
×: Practically unusable Average Particle Diameter
The particle diameter distribution was measured by Coulter counter method (using a Coulter counter II made by Beckman Coulter, Inc.).

Maximum Particle Diameter

The maximum particle diameter was measured using a sieve.

Thickness of Film

Using a dial gauge SM-1201 made by Teclock, the thicknesses of each film was measured (in micrometers) at 10 points, and the average of the thicknesses was calculated.

Lamination Strength
(1) Two-part Urethane Adhesive: Containing the Following Components at the Following Rates
   Major component: Takelac A-515 made by Mitsui Takeda Chemicals, Inc. . . . 50 g
   Curing agent: Takenate A-50 made by Mitsui Takeda Chemicals, Inc. . . . 5 g
   Solvent: Ethyl acetate . . . 40 g
   Mixture ratio: Main component:Curing agent:Solvent=10: 1:8
   How to apply: An appropriate amount of the mixture was dropped on the application surface using Meir-Bar #4, and it was hand-coated.
   Application surface: The surface on which an anchor coat is formed but not a deposited film is referred to as "AC" surface, and the surface on which aluminum is deposited is referred to as "aluminum deposited surface".
   Drying conditions: 80 degrees C.×30 seconds (Forced hot air circulation type ventilating oven)
(2) Laminating Conditions
   Lamination structure: Aliphatic polyester film/Aluminum deposited surface/Urethane adhesive/#25PET (film-to-film lamination)
   Lamination heating roll conditions: Lamination temperature=85 degrees C.
   Aging conditions after lamination: 35 degrees C.×2 days (48 hours)
(3) Measurement of Lamination Strength
   Adjustment of specimens:
   i. Double-coated adhesive tape was applied to the side of each specimen opposite to the aluminum deposited surface.
   ii. Each specimen was cut to 15 mm wide (TD)×150 mm (MD).
   iii. A plastic board was stuck on the double-coated adhesive tape. (Plastic board was a polycarbonate board measuring 30 mm wide×150 mm long×2 mm thick.)
   Measurement: 180° peel strength of the plastic board and #25PET was measured.
   Tensile strength: 100 mm/minute
   Because there is the possibility of stick slip, the lamination strength was obtained as the average of lower limits, and was evaluated by the following standards:
   ◎: Lamination strength was not less than 300 grams/15 mm width.
   ○: Lamination strength was not less than 100 grams/15 mm width.
   Δ: Lamination strength was in the range of 50 to 100 grams/15 mm width.
   ×: Lamination strength was less than 50 grams/15 mm width.

Comprehensive Evaluation

The specimens were comprehensively evaluated by the following standards, taking into consideration the gas permeability, total thickness, peel strength, haze, damage to film while being fed and lamination strength.
◎: Excellent
○: Good
Δ: Practically usable
×: Practically unusable Production Examples 1 and 2 of Polylactic Acid Resin 15 ppm of tin octylate was added to 100 kg of L-lactide made by Purac Japan (trade name: PURASORB L), and the mixture was fed into a 500-liter batch type polymerization tank with an agitator and a heater. Polymerization was carried out at 185 degrees C. for 60 minutes with a stirring speed of 100 rpm while performing nitrogen substitution. The molten material thus obtained was fed into a 40 mm diameter twin-screw (extending in the same direction) extruder with a three-stage vacuum vent made by Mitsubishi Heavy Industries, Ltd., extruded into strands at 200 degrees C. while removing any volatile components at a vent pressure of 4 torr, and then pelletized.

The thus obtained polylactic acid resin had a weight-average molecular weight of 200000 with the content of L-lactic acid being 99.5%. After annealing at 120 degrees C. for 4 hours, the pellets had a melting point of 178 degrees C. as measured by differential scanning calorimetry (DSC). Similarly, a lactic acid resin having a weight-average molecular weight of 200000 and containing 98.0% of L-lactic acid was prepared by adjusting the amounts of L-lactide and DL-lactide added. After annealing at 120 degrees C. for 4 hours, the pellets had a melting point of 162 degrees C. as measured by DSC.

Production Examples 3 and 4 of Polylactic Acid Resin 15 ppm of tin octylate was added to a mixture of 94 kg of L-lactide (trade name: PURASORB L) and 6 kg of DL-lactide (trade name: PURASORB DL), both made by Purac Japan, and the mixture was fed into a 500-liter batch type polymerization tank with an agitator and a heater. Polymerization was carried out at 185 degrees C. for 60 minutes with a stirring speed of 100 rpm while performing nitrogen substitution. The molten material thus obtained was fed into a 40 mm diameter twin-screw (extending in the same direction) extruder with a three-stage vacuum vent made by Mitsubishi Heavy Industries, Ltd., extruded into strands at 200 degrees C. while removing any volatile components at a vent pressure of 4 torr, and then pelletized.

The thus obtained polylactic acid resin had a weight-average molecular weight of 200000 with the content of L-lactic acid being 97.0%. After annealing at 120 degrees C. for 4 hours, the pellets had a melting point of 154 degrees C. as measured by DSC. Similarly, a lactic acid resin having a weight-average molecular weight of 200000 and containing 94.8% of L-lactic acid was prepared by adjusting the amounts of L-lactide and DL-lactide added. After annealing at 120 degrees C. for 4 hours, the pellets had a melting point of 145 degrees C. as measured by DSC.

Production Example 5 of Polylactic Acid Resin 15 ppm of tin octylate was added to a mixture of 85 kg of L-lactide (trade name: PURASORB L) and 15 kg of DL-lactide (trade name: PURASORB DL), both made by Purac Japan, and the mixture was fed into a 500-liter batch type polymerization tank with an agitator and a heater. Polymerization was carried out at 185 degrees C. for 60 minutes with a stirring speed of 100 rpm while performing nitrogen substitution. The molten material thus obtained was fed into a 40 mm diameter twin-screw (extending in the same direction) extruder with a three-stage vacuum vent made by Mitsubishi Heavy Industries, Ltd., extruded into strands at 200 degrees C. while removing any volatile components at a vent pressure of 4 torr, and then pelletized.

The thus obtained polylactic acid resin had a weight-average molecular weight of 200000 with the content of L-lactic acid being 92.6%. After annealing at 120 degrees C. for 4 hours, the pellets had a crystalline melting point of 131 degrees C. as measured by DSC.

Production Example 6 of Polylactic Acid Resin 15 ppm of tin octylate was added to a mixture of 80 kg of L-lactide (trade name: PURASORB L) and 20 kg of DL-lactide (trade name: PURASORB DL), both made by Purac Japan, and the mixture was fed into a 500-liter batch type polymerization tank with an agitator and a heater. Polymerization was carried out at 185 degrees C. for 60 minutes with a stirring speed of 100 rpm while performing nitrogen substitution. The molten material thus obtained was fed into a 40 mm diameter twin-screw (extending in the same direction) extruder with a three-stage vacuum vent made by Mitsubishi Heavy Industries, Ltd., extruded into strands at 200 degrees C. while removing any volatile components at a vent pressure of 4 torr, and then pelletized.

The thus obtained polylactic acid resin had a weight-average molecular weight of 200000 with the content of L-lactic acid being 89.7%. It had no crystalline melting point as measured by DSC. That is, it was confirmed that this polylactic acid resin was amorphous.

extruder on the outermost layer of an extruding machine for coextruding lamination comprising two kinds of three layers, coextruded into a sheet at a temperature of 210 degrees C., and hardened by quickly cooling on a rotating cooling drum to obtain a substantially amorphous sheet.

Using a film tenter made by Mitsubishi Heavy Industries, Ltd., the sheet obtained was stretched 3 times in the longitudinal direction between rolls being rotated at different peripheral speeds while being heated to 75 degrees C. by contact with hot water circulating rolls and by an infrared heater. The thus longitudinally stretched sheet was guided into the tenter while being held by a clip and stretched 3.0 times in the direction transverse to the feed direction of the sheet at 75 degrees C., and then subjected to heat treatment at 140 degrees C. for 15 seconds to obtain a film 25 micrometers thick. Immediately before being wound by a winder, the AC surface of the film was subjected to corona treatment.

In order to increase the adhesion of the film to another film, an anchor coating agent comprising 1 part by mass of a copolymer polyester resin (Vylon 200; made by Toyobo, Ltd.), 0.1 parts by mass of a isocyanate compound (hexamethylene diisocyanate; made by Nippon Polyurethane Industry Co., Ltd.), 25 parts by mass of toluene, and 25 parts by mass of methylethylketone was applied to the side of the film that was subjected to corona treatment before vapor deposition in the amount of 0.2 μm in a dry state, and dried at 80 degrees C. The thus obtained aliphatic polyester film was free of wrinkles. To this side of the film, aluminum (99.9 mol % in

TABLE 1

| | | D % | Weight-average molecular weight | Glass transition temperature (° C.) | Melting point (° C.) | Crystallinity | ΔHm (J/g) |
|---|---|---|---|---|---|---|---|
| Production Examples | 1 | 0.5 | 200000 | 56 | 178 | Highly crystalline | 50 |
| | 2 | 2 | 200000 | 56 | 162 | Crystalline | 42 |
| | 3 | 3 | 200000 | 56 | 154 | Crystalline | 38 |
| | 4 | 5.2 | 200000 | 56 | 145 | Crystalline | 35 |
| | 5 | 7.4 | 200000 | 53 | 131 | Low crystalline | 13 |
| | 6 | 10.3 | 200000 | 53 | — | Amorphous | 0 | annealing 120° C., 4 hr

Examples 1 to 8 of the Invention and Comparative Examples 1 to 5

Inorganic particles were prepared by drying 1 part by weight of silicon dioxide having an average particle diameter of 1.4 μm (silica; made by Fuji Silysia Chemical Ltd.) to sufficiently remove moisture, feeding the thus dried silica into a 40 mm diameter twin-screw (extending in the same direction) extruder together with 100 parts by mass of polylactic acid resin for forming layer A in Tables 2 and 3, melting and mixing them together at about 200 degrees C., extruding the mixture into strands, and cutting the strands into pellets while cooling. The pellets, as a master batch, were dried again and were added by 10 mass percent to the polylactic acid, which was also dried, to form layer A as a surface layer. The thus formed surface layer or layers and the intermediate layer (layer B) shown in Tables 2 and 3 were fed into a 40 mm diameter twin-screw (extending in the same direction)

purity) was continuously deposited in an atmosphere of which the degree of vacuum was kept at $1\times10^{-4}$ hPa using a vacuum deposition device of the electron beam heating type (made by Leybold AG) to form an aluminum deposited film having a thickness of 60 nm.

The thus obtained film was evaluated for its gas barrier properties (oxygen gas permeability), lamination strength, haze and damage to the film while being fed in the above-described manner. The results are shown in Tables 2 and 3.

Example 9 of the Invention

On the aliphatic polyester film produced in Example 1, a film of aluminum or an aluminum-silica-manganese alloy was formed by electron beam deposition. The deposited film (60 nm in thickness) of pure aluminum (99.9 mol % in purity), which was formed with the degree of vacuum set at $1\times10^{-4}$ hPa, had an average grain size of 100 nm. The film of an Al—Si—Mn (98.1 mol %/1.1 mol %/0.8 mol %) alloy formed under the same conditions had an average grain size of 30 nm. The former film had an oxygen gas permeability of 5 cc/m²·24hr·atm, while the latter film had an oxygen gas permeability of 3 cc/m²·24hr·atm. These values are both acceptable. The former film had a very high metallic gloss level of 766%. The latter film had a metallic gloss level of 722%, which is acceptable.

The lamination strength was 400 grams/15 mm width. Before deposition, the gloss level of the aliphatic polyester film produced in Example 1 was 120%.

Example 10 of the Invention

Except that an AC agent was applied to the aliphatic polyester film produced in Example 1 of the invention before deposition and that an aluminum alloy comprising 91 mol % of aluminum, 4.5 mol % of magnesium and 3.5 mol % of tantalum was used, the deposited film was formed in the same manner as in Example 9 of the invention. The film obtained had an oxygen gas permeability of 4 cc/m²·24hr·atm, a gloss level of 550% and a lamination strength of 390 grams/15 mm width. The film was thus practically usable as packaging materials.

Example 11 of the Invention

After applying an AC agent on the aliphatic polyester film produced in Example 1 of the invention, silicon oxide (SiOx; x=1.5) was deposited by electron beam deposition to form a deposited film having a thickness of 40 nm. The film obtained had an oxygen gas permeability of 3 cc/m²·24hr·atm and a lamination strength of 370 grams/15 mm width. The film was thus practically usable as packaging materials.

Example 12 of the Invention

A film obtained in Example 1 of the invention having a thickness of 25 micrometers and a thin film deposited was cut into specimens each measuring 100 mm long and 15 mm wide. Each specimen was held in a 20-mesh holder made of SUS steel, put in a household composter (Ecolompo EC-25D made by Shizuoka Seiki Co., Ltd.) together with 20 kg of mature leaf mold and 10 kg of dog food (VITA-ONE made by Nippon Pet Food), and left for 5 weeks while adding 500 cc of water every day. Five weeks later, the yield (rate of each specimen that remained in the holder) was measured. The yield was not more than 30%, which clearly indicate that the specimens were noticeably decomposed, and were thus sufficiently biodegradable.

TABLE 2

| | | Example of the invention | | | | | | | |
|---|---|---|---|---|---|---|---|---|---|
| | | 1 | 2 | 3 | 4 | 5 | 6 | 7 | 8 |
| Layer A | | | | | | | | | |
| Polylactic acid 1 | Production Example D % | | | | | 6 10.3 | | | |
| Polylactic acid 2 | Production Example D % | | 2 | 2 | | | 3 3 | 4 5.2 | 5 7.4 |
| Polylactic acid 1: Polylactic acid 2 | (mass ratio) | 90:10 | 85:15 | 75:25 | 60:40 | 50:50 | 60:40 | 60:40 | 60:40 |
| Layer B | | | | | | | | | |
| Polylactic acid 3 | Production Example D % | | | | | 2 2 | | | |
| Polylactic acid 4 | Production Example D % | | | | | 6 10.3 | | | |
| Polylactic acid 3: Polylactic acid 4 | (mass ratio) | 100:0 | 100:0 | 100:0 | 100:0 | 100:0 | 50:50 | 70:30 | 85:15 |
| (mass ratio) Thickness (✕ 1) Laminated film | (μm) | | | | | 3.5/18/3.5 | | | |
| Haze | (%) | 3 | 3 | 3 | 3 | 4 | 4 | 3 | 3 |
| Impact resistance (Hydrojet impact value) | (kgf·mm) | 72 | 76 | 79 | 83 | 88 | 36 | 53 | 62 |
| Shrinkage factor P/V at 120° C. | (%) | 3.0/1.7 | 4.2/1.7 | 4.0/1.8 | 3.8/1.9 | 3.7/1.6 | 7.8/7.5 | 4.8/4.7 | 3.9/3.6 |
| AC agent applied to layer A | | | | | | Polyester | | | |
| Lamination strength before deposition | (g/15 mm width) | 450 | 400 | 370 | 350 | 300 | 370 | 400 | 450 |

TABLE 2-continued

|  |  | Example of the invention | | | | | | | |
|---|---|---|---|---|---|---|---|---|---|
|  |  | 1 | 2 | 3 | 4 | 5 | 6 | 7 | 8 |
| Deposited film | | | | | | | | | |
| Inorganic film (type and thickness) | | Aluminum 60 nm | | | | | | | |
| Damage to film while being fed | | fairly good | good | excellent | excellent | excellent | excellent | good | fairly good |
| Lamination strength after deposition | (g/15 mm width) | 440 | 390 | 360 | 330 | 280 | 350 | 360 | 440 |
| Oxygen gas permeability | (cc/m² · 24hr) | 4 | 3 | 3 | 3 | 3 | 4 | 4 | 5 |
| Comprehensive evaluation | | Δ | ○ | ○ | ○ | Δ | Δ | ○ | Δ |

※1: thickness of layer A/layer B/layer A

TABLE 3

|  |  | Comparative Example | | | | |
|---|---|---|---|---|---|---|
|  |  | 1 | 2 | 3 | 4 | 5 |
| Layer A | | | | | | |
| Polyactic acid 1 | Production Example | | | 6 | | |
|  | D % | | | 10.3 | | |
| Polyactic acid 2 | Production Example | | | 2 | | |
|  | D % | | | 2 | | |
| Polylactic acid 1: Polylactic acid 2 | (mass ratio) | 95:5 | 45:55 | 0:100 | 0:100 | 75:25 |
| Layer B | | | | | | |
| Polylactic acid 3 | Production Example | | | 2 | | |
|  | D % | | | 2 | | |
| Polylactic acid 4 | Production Example | | | 6 | | |
|  | D % | | | 10.3 | | |
| Polylactic acid 3: Polylactic acid 4 (mass ratio) | (mass ratio) | 100:0 | 100:0 | 100:0 | 100:0 | 45:55 |
| Thickness (※1) | (μm) | | | 3.5/18/3.5 | | |
| Laminated film | | | | | | |
| Haze | (%) | 4 | 4 | 4 | 4 | 3 |
| Impact resistance (Hydrojet impact value) | (kgf · mm) | 70 | 86 | 103 | 106 | 28 |
| Shrinkage factor P/V at 120° C. | (%) | 4.4/1.9 | 3.0/1.0 | 2.2/0.3 | 2.2/0.3 | 12/11 |
| AC agent applied to layer A | | | Polyester | | none | Polyester (wrinkles due to shrinkage) |
| Lamination strength before deposition | (g/15 mm width) | — | 45 | — | — | |
| Deposited film | | | | | | |
| Inorganic film (type and thickness) | | — | Aluminum 60 nm | | | |
| Damage to film while being fed | | blocking before AC | excellent | excellent | excellent | — |
| Lamination strength after deposition | (g/15 mm width) | — | 40 | 10 | 10 | — |
| Oxygen gas permeability | (cc/m² · 24 hr) | — | 4 | 5 | 5 | — |
| Comprehensive evaluation | | x | x | x | x | x |

※1: thickness of layer A/layer B/layer A

What is claimed is:

1. A biaxially stretched aliphatic polyester film comprising at least two layers and having a shrinkage percentage at 120° C. of equal to or less than 10%:
   one of said two layers comprising an amorphous polylactic acid resin and a crystalline polylactic acid resin so as to satisfy the relation: (mass percentage of the amorphous polylactic acid resin)≧(mass percentage of the crystalline polylactic acid resin);
   the other of said two layers comprising an amorphous polylactic acid resin and a crystalline polylactic acid resin so as to satisfy the relation: (mass percentage of the amorphous polylactic acid resin)<(mass percentage of the crystalline polylactic acid resin).

2. The aliphatic polyester film of claim 1 further comprising an inorganic deposited layer formed on one of the at least two layers.

3. The aliphatic polyester film including the inorganic deposited layer of claim 2 wherein said inorganic deposited layer comprises at least one of aluminum, an alloy of mainly aluminum, silicon oxide, aluminum oxide, and a composite of aluminum oxide and silicon.

4. The aliphatic polyester film including the inorganic deposited layer of claim 3 wherein said inorganic deposited layer contains 90 to 99.8 mol% of aluminum, and 0.2 to 10.0 mol% of at least one of magnesium, silicon, tantalum, titanium, boron, calcium, barium, carbon and manganese.

5. The aliphatic polyester film of claim 1 further comprising:
   an anchor coat disposed on one of the at least two layers; and
   an inorganic deposited layer formed on said anchor coat.

6. A biaxially stretched aliphatic polyester film comprising at least two layers and having a shrinkage percentage at 120° C. of equal to or less than 10%:
   one of said two layers comprising an amorphous polylactic acid resin and a crystalline polylactic acid resin so as to satisfy the relation: (mass percentage of the amorphous polylactic acid resin)≧(mass percentage of the crystalline polylactic acid resin);
   the other of said two layers comprising an amorphous polylactic acid resin and a crystalline polylactic acid resin so as to satisfy the relation: (mass percentage of the amorphous polylactic acid resin)<(mass percentage of the crystalline polylactic acid resin);
   said amorphous polylactic acid resin contained in either of said two layers containing D-lactic acid and L-lactic acid in a weight ratio of 10/90≦(D-lactic acid/L-lactic acid)≦90/10;
   said crystalline polylactic acid resin contained in either of said two layers containing D-lactic acid and L-lactic acid in a weight ratio of 0.5/99.5≦(D-lactic acid/L-lactic acid)≦6/94 or 99.5/0.5≧(D-lactic acid/L-lactic acid)≧94/6.

7. The aliphatic polyester film of claim 6 further comprising an inorganic deposited layer formed on one of the at least two layers.

8. The aliphatic polyester film including the inorganic deposited layer of claim 7 wherein said inorganic deposited layer comprises at least one of aluminum, an alloy of mainly aluminum, silicon oxide, aluminum oxide, and a composite of aluminum oxide and silicon.

9. The aliphatic polyester film including the inorganic deposited layer of claim 8 wherein said inorganic deposited layer contains 90 to 99.8 mol% of aluminum, and 0.2 to 10.0 mol% of at least one of magnesium, silicon, tantalum, titanium, boron, calcium, barium, carbon and manganese.

10. The aliphatic polyester film of claim 6 further comprising:
    an anchor coat disposed on one of the at least two layers; and
    an inorganic deposited layer formed on said anchor coat.

11. A method for forming an aliphatic polyester film comprising the steps of:
    coextruding resins each forming one of layers A and B;
    providing an anchor coat on a surface of one of the layers; and
    forming an inorganic deposited layer on the anchor coat;
    said layer A containing an amorphous polylactic acid resin and a crystalline polylactic acid resin so as to satisfy the relation: (mass percentage of the amorphous polylactic acid resin)≧(mass percentage of the crystalline polylactic acid resin);
    said layer B containing an amorphous polylactic acid resin and a crystalline polylactic acid resin so as to satisfy the relation: (mass percentage of the amorphous polylactic acid resin)<(mass percentage of the crystalline polylactic acid)resin); and
    a film comprising said layers A and B having a shrinkage percentage at 120° C. of equal to or less than 10% before the anchor coat is provided.

12. The method of claim 11, wherein after the coextrusion step, stretching the film, prior to providing the anchor coat.

13. The method of claim 11, wherein said inorganic deposited layer comprises at least one of aluminum, an alloy of mainly aluminum, silicon oxide, aluminum oxide, and a composite of aluminum oxide and silicon.

14. The method of claim 13, wherein said inorganic deposited layer comprises 90 to 99.8 mol% of aluminum, and 0.2 to 10.0 mol% of at least one of magnesium, silicon, tantalum, titanium, boron, calcium, barium, carbon and manganese.

15. A packaging material formed of the aliphatic polyester film including the inorganic deposited layer formed by claim 11.

* * * * *